(12) United States Patent
Eaton et al.

(10) Patent No.: US 7,697,223 B2
(45) Date of Patent: Apr. 13, 2010

(54) MONITORING A FLY HEIGHT OF A MAGNETIC TRANSDUCER

(75) Inventors: Robert E. Eaton, San Jose, CA (US); Hai C. Nguy, San Jose, CA (US); Jeffrey R. Williams, Aptos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 407 days.

(21) Appl. No.: 11/894,317

(22) Filed: Aug. 20, 2007

(65) Prior Publication Data

US 2009/0052091 A1 Feb. 26, 2009

(51) Int. Cl.
*G11B 27/36* (2006.01)
(52) U.S. Cl. .................................................. 360/31
(58) Field of Classification Search .................. 360/31, 360/53, 75, 55, 39, 46, 25, 67
See application file for complete search history.

(56) References Cited

U.S. PATENT DOCUMENTS

| 5,307,213 | A | * | 4/1994 | Nishiyama | 360/46 |
| 5,435,188 | A | * | 7/1995 | Lew et al. | 73/861.22 |
| 5,591,923 | A | * | 1/1997 | Lew et al. | 73/861.22 |
| 5,734,598 | A | * | 3/1998 | Abbott et al. | 708/322 |
| 5,818,656 | A | * | 10/1998 | Klaassen et al. | 360/67 |
| 5,995,313 | A | * | 11/1999 | Dakroub | 360/67 |
| 6,104,557 | A | * | 8/2000 | Kasai et al. | 360/46 |
| 6,304,396 | B1 | * | 10/2001 | Ramalho et al. | 360/25 |
| 6,381,082 | B1 | * | 4/2002 | Voorman et al. | 360/25 |
| 6,449,110 | B1 | * | 9/2002 | DeGroat et al. | 360/46 |
| 6,665,134 | B2 | * | 12/2003 | Ottesen et al. | 360/31 |
| 6,671,111 | B2 | * | 12/2003 | Ottesen et al. | 360/31 |
| 7,012,772 | B1 | * | 3/2006 | Vis | 360/46 |
| 7,561,365 | B2 | * | 7/2009 | Noguchi et al. | 360/75 |
| 2001/0036026 | A1 | * | 11/2001 | Chen et al. | 360/31 |

* cited by examiner

*Primary Examiner*—Fred Tzeng (57) ABSTRACT

A method for monitoring a fly height of a magnetic transducer comprises flying the magnetic transducer at a distance of separation from a recording media. A read-back signal is read with the magnetic transducer from the recording media. The read-back signal is rectified to produce a rectified signal. The rectified signal is filtered thereby providing a filtered signal. A fault signal is provided in response to the filtered signal exceeding a threshold.

25 Claims, 5 Drawing Sheets

MONITORING A FLY HEIGHT OF A MAGNETIC TRANSDUCER

TECHNICAL FIELD

This invention relates generally to the field of direct access storage devices and in particular to the monitoring a fly height of a magnetic transducer by power spectrum analysis of the read-back signal.

BACKGROUND

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

The amount of data that can be stored on a disk is governed by many well known physical principles. There exists a direct correlation between the distance that a magnetic transducer is spaced from the recording media and the amount of data that can be stored on the disk. This distance is typically known as "fly height." This relationship is expressed by the Wallace equation, which is well understood in the art of magnetic recording. The Wallace equation teaches that as fly height increases, the amount of data that can be stored on the media decreases. Conversely, as fly height decreases, the amount of data that can be stored on the media increases. The Wallace equation expresses the importance of controlling fly height so that data density can be controlled.

Historically, fly height of a magnetic transducer has been controlled through the design of the slider, upon which the magnetic transducer is coupled. The slider comprises a surface known as an ABS (air bearing surface) which in operation faces the media of a magnetic recording disk. The ABS is patterned and configured such that as the disk spins adjacent to the ABS, a film of air is created which provides spacing and support for the magnetic transducer away from the spinning disk media. The ABS is designed using well understood principles of aerodynamics and fluid flow.

The ever increasing demand for data density has made the small variations in fly height, which are inherently caused by manufacturing tolerances and the operating environment of the HDD, unacceptable. The ABS by itself can no longer keep pace with demands for increased data density. The Wallace equation implies that increased data density requires decreased fly height. Decreased fly height creates challenges for reliability and increases the risk of a head crash and lost data.

SUMMARY OF THE INVENTION

Various embodiments of the present invention are described herein. A method for monitoring a fly height of a magnetic transducer comprises flying the magnetic transducer at a distance of separation from a recording media. A read-back signal is read with the magnetic transducer from the recording media. The read-back signal is rectified to produce a rectified signal. The rectified signal is filtered thereby providing a filtered signal. A fault signal is provided in response to the filtered signal exceeding a threshold.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

The discussion will begin with a brief overview of a hard disk drive (HDD) which comprises a head stack assembly (HSA) having an arm electronics (A/E) module whereby desirable performance of an HDD can be enabled by embodiments of the present invention. The discussion will then focus on embodiments of the present invention by which an A/E module is enabled to monitor the fly height of a magnetic transducer. The implementation of embodiments of the present invention will then be discussed.

Overview

Figure 1:
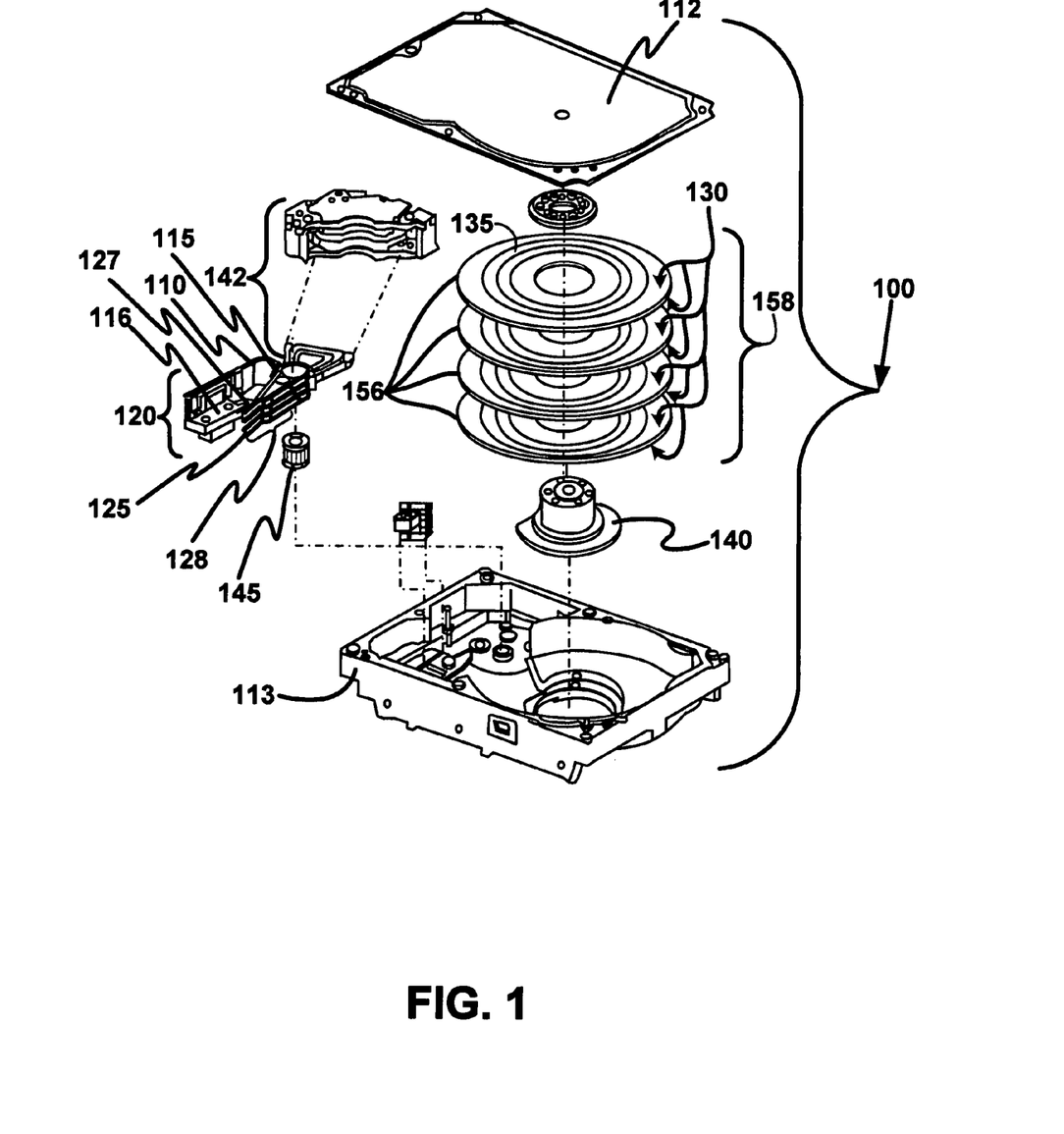
FIG. 1 is an isometric blow-apart of an HDD in accordance with one embodiment of the present invention.

With reference to FIG. 1, an isometric blow-apart of HDD 100 is presented in accordance with an embodiment of this invention. Base casting 113 provides coupling points for components and sub-assemblies such as disk stack 158, voice coil motor (VCM) 142, and HSA 120. Disk stack 158 is coupled with base casting 113 by means of motor-hub assembly 140. Motor-hub assembly 140 will have at least one disk 156 coupled to it such that disk 156 can rotate about an axis common to motor-hub assembly 140 and the center of disk 156. Disk 156 has at least one disk surface 130 upon which reside data track 135. HSA 120, sometimes referred to as an actuator assembly, comprises suspension 127, which suspends hard disk drive slider 125 next to disk surface 130, and connector 116, which conveys data between A/E module 115 and a host system wherein HDD 100 resides. Suspension 127 and hard disk drive slider 125 comprise head gimbal assembly (HGA) 128. Flex cable 110, which is part of HSA 120, conveys data between connector 116 and A/E module 115.

HSA 120 is coupled pivotally with base casting 113 by means of pivot bearing 145, such that VCM 142 can move HGA 128 with slider 125 arcuately across disk surface 130.

Upon assembly of HSA 120, disk stack 158, VCM 142, and other components with base casting 113, cover 112 is coupled to base casting 113 to enclose these components and sub-assemblies into HDD 100.

Figure 2:
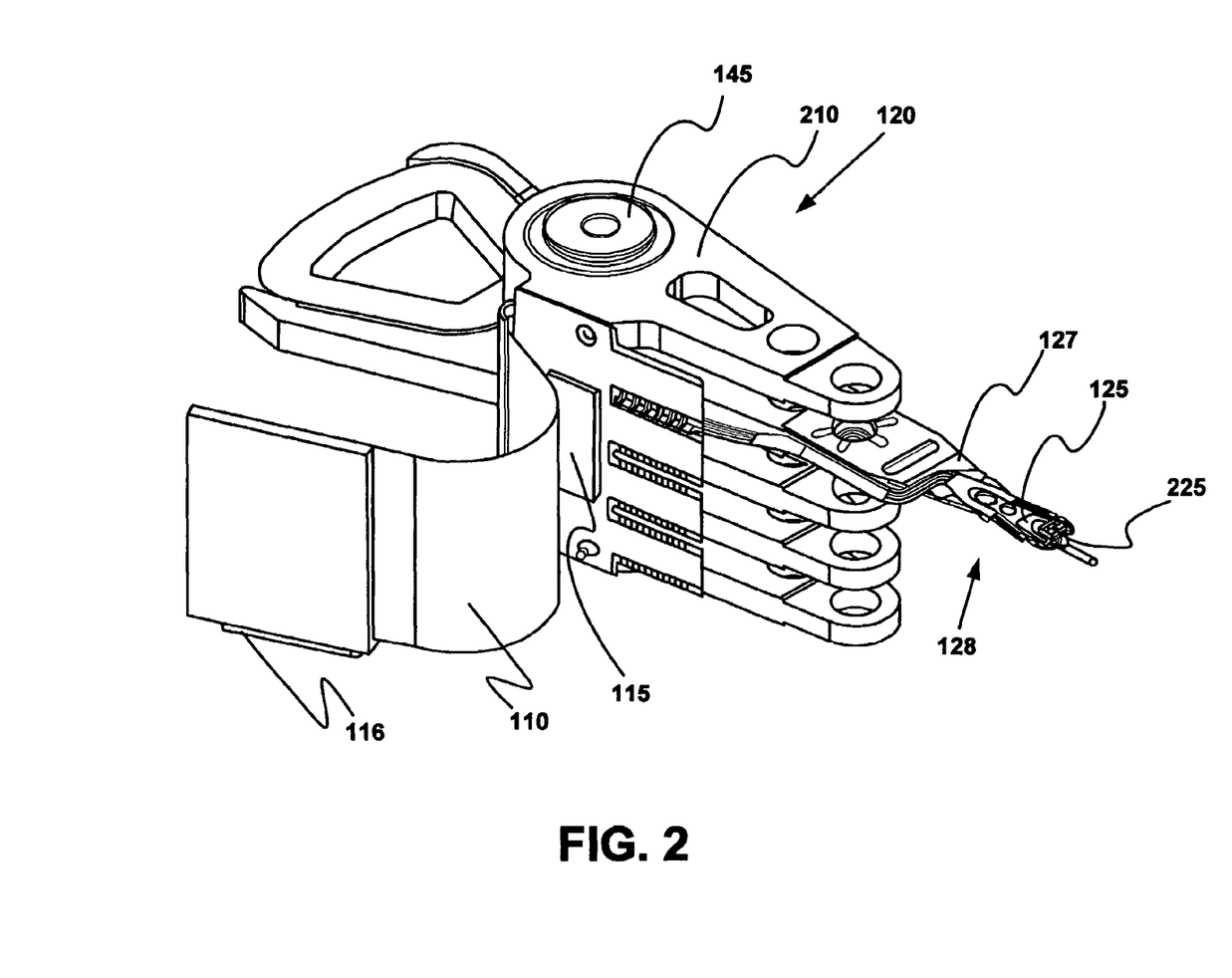
FIG. 2 is an isometric of head stack assembly (HSA) in accordance with one embodiment of the present invention.

With reference to FIG. 2 an isometric of a head stack assembly (HSA) 120 is presented in accordance with one embodiment of the present invention. Many of the elements of FIG. 2 are also presented in FIG. 1. For the sake of clarity, they are presented in more detail in FIG. 2.

HSA 120 comprises comb 210. At least one HGA 128 is coupled to comb 210. For the sake of brevity and clarity, one HGA 128 is presented in FIG. 2. It is obvious that a plurality of HGAs can be added to comb 210 without detracting from the embodiment of the present invention. HGA 128 comprises suspension 127 and slider 125, wherein magnetic transducer 225 is coupled. Magnetic transducer 225 reads and writes data tracks 135 onto surface 130 of disk 156. Pivot bearing 145 is coupled to HSA 120 and to base casting 113 thus allowing HSA 120 to move magnetic transducer 225 arcuately across data tracks 135.

Since magnetic transducer 225 is coupled to slider 125, the distance of separation, or fly height, at which magnetic transducer 225 flies is determined primarily by the ABS of slider 125. It is appreciated that other parameters of HDD 100 determine the fly height of magnetic transducer 225. The design and fabrication of the ABS sets the fly height of the slider for nominal operating conditions. The fly height is tested in the factory and the slider with its coupled magnetic transducer is shipped as part of an HDD to the customer. The fly height of the magnetic transducer is influenced by many randomly occurring factors beyond the control of the ABS and HDD designers. Examples of these factors are: temperature, atmospheric pressure, contamination, and mechanical shock.

Changes in fly height can affect the performance of the HDD. If the magnetic transducer flies too high, the amplitude of the read-back signal becomes too weak against background noise. If the magnetic transducer flies too low, there is the exposure and risk of the magnetic transducer contacting the disk. The consequences of contacting the disk can range from a perturbation in the read-back signal, necessitating a retry to read data, to a catastrophic head crash, whereby the disk surface is damaged and a customer's data is destroyed.

There has been a long felt need in the HDD art to have a means for adjusting fly height. Some examples of means for adjusting fly height are: a PZT coupled with a suspension to deflect the suspension and urge the magnetic transducer closer to or farther from the magnetic recording media; a shape memory alloy, also known as SMA and NITINOL, coupled with a suspension to deflect the suspension and urge the magnetic transducer closer to or farther from the magnetic recording media; a PZT coupled with a slider to deflect the slider and urge the magnetic transducer closer to or farther from the magnetic recording media; and a thermal fly height control (TFC) coupled with the magnetic transducer to urge the magnetic transducer closer to the magnetic recording media.

The above examples of means for adjusting fly height are designed to increase or decrease the fly height of the magnetic transducer in preparation for a specific function of an HDD such as reading data tracks and writing data tracks. The embodiments of the present invention provide a means for an HDD to react to a change in the operating conditions of the HDD and adjust the fly height appropriately. The embodiments of the present invention are operable for all means for adjusting fly height in an HDD.

Physical Description

Figure 3:
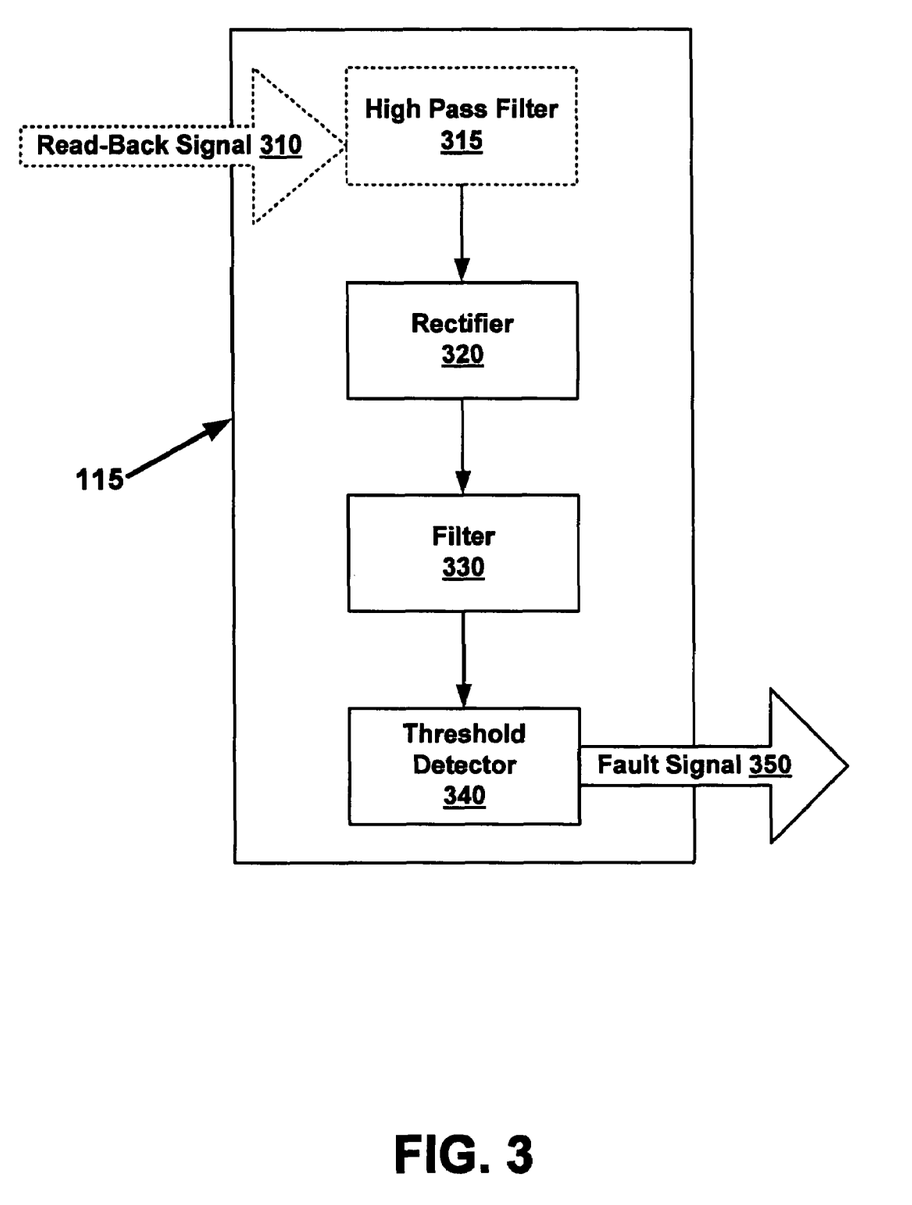
FIG. 3 is a block diagram illustrating an arm electronics (A/E) module operable for monitoring a fly height of a magnetic transducer in accordance with one embodiment of the present invention.

With reference to FIG. 3, a block diagram illustrating arm electronics (A/E) module 115 operable for monitoring a fly height of magnetic transducer 225 is presented in accordance with one embodiment of the present invention. A/E module 115 is operable for receiving read-back signal 310 from magnetic transducer 225.

A/E module 115 comprises: rectifier 320 for rectifying read-back signal 310 and operable for providing a rectified signal of read-back signal 310; filter 330 operable for providing a filtered signal of the rectified signal from rectifier 320; and a threshold detector 340 operable for presenting fault signal 350 coupled with an occurrence of a mechanical frequency of magnetic transducer 225 occurring in the filtered signal from filter 330. Filter 330 is optionally a programmable low pass or band pass filter whereby an optimal frequency can be set, possibly extending into the DC range. Threshold detector 340 is operable for presenting fault signal 350 in response to a mechanical frequency of magnetic transducer 225 such as a resonant frequency, a broad band frequency, and a narrow band frequency.

In accordance with another embodiment of the present invention, A/E module 114 also comprises an optional high pass filter 315 for filtering read-back signal prior to demodulation by rectifier 320. High pass filter 315 is configured to receive read-back signal 310 and is operable to removing a frequency that is associated with noise that is not read by magnetic transducer 225. The sources of such noise are well known in the art. Examples of such noise sources are: thermal resistance changes of magnetic transducer 225 Johnson noise, shot noise; pre-amplifier noise; 1/f noise in magnetic transducer 225; and other such spurious low frequency noise. These noise sources are only listed as examples of noise sources and are not intended to be an exhaustive listing of all noise sources.

High pass filter 315 is enabling to make the setting of threshold detector 340 more consistent by removing a low frequency that may not be repeatable or constant. A frequency filtered by high pass filter 315 is usually higher than the frequency filtered by filter 330.

Rectifier 320 is operable for folding a double-sideband signal, for example due to a mechanical frequency of magnetic transducer 225, around carrier frequencies, for example due to a data track, resulting in a lower frequency range. When rectifier 320 is in operation, the resulting low frequency amplitude of the signal caused by the mechanical frequency is high in comparison to noise from extraneous sources and can be easily detected. Additionally, rectifier 320 looks at the instantaneous power in the signal caused by the mechanical frequency of magnetic transducer 225.

Threshold detector 340 is any one of threshold detectors well known in the art. Examples of threshold detector 340 are: a simple peak amplitude detector, a peak amplitude threshold detector with timing qualification, an RMS threshold detector, and an integrator threshold detector.

In accordance with an embodiment of the present invention, a wave form such as that of read-back signal 310 may be rectified by any means such as rectifier 320. Some examples of means for rectifying read-back signal 310 are: diode(s), Schottky diode(s), Zener diode(s), all of these examples of rectifiers being full wave rectifiers and half wave rectifiers.

In accordance with an embodiment of the present invention, filter 330 is operable for passing at least one mechanical frequency of a magnetic transducer, which is coupled to a slider. An example of a range of a mechanical frequency that filter 330 is operable for passing is a range of 100 KHz to 500 KHz. Filter 330 is optionally a programmable low pass or band pass filter whereby an optimal frequency can be set, possibly extending into the DC range.

In accordance with an embodiment of the present invention, threshold detector 340 is coupled to an output port. Threshold detector 340 is operable for detecting at least one occurrence of at least one mechanical frequency of a magnetic transducer, which is coupled to a slider. The output port is operable for conveying fault signal 350 from threshold detector 340 to other electronic devices such as a controller of HDD 100.

Figure 4:
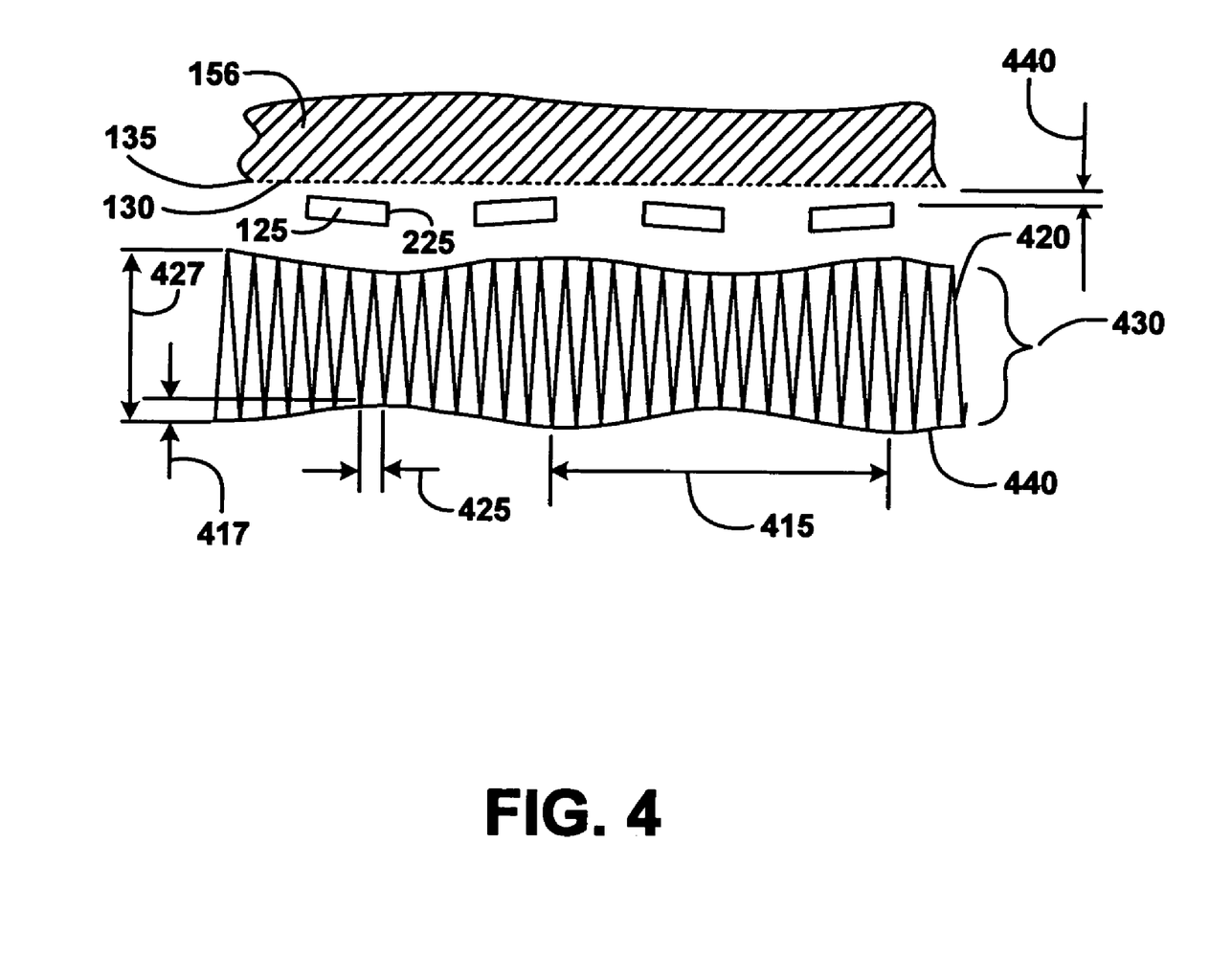
FIG. 4 is a side view of a flying slider and a read-back signal in accordance with one embodiment of the present invention.

With reference to FIG. 4, a side view of slider 125 flying adjacent to data track 135 on disk 156, and a resulting read-back signal 430 are presented in accordance with one embodiment of the present invention. In accordance with an embodiment of the present invention, read-back signal (310, 430) comprises data frequency 420 associated with data written on data tracks 135, and modulation frequency 410 associated with at least one mechanical frequency of magnetic transducer 225. The mechanical frequency of magnetic transducer 225, which is coupled with slider 125, reflects the mechanical frequency of slider 125. This is due in part to the changes in fly height 440 experienced by magnetic transducer 225 during vibration of slider 125. As slider 125 vibrates magnetic transducer 225 cycles between being closer and being farther from data track 135. In accordance with the Wallace equation, read-back signal (310, 430), which is read by magnetic transducer 225, fluctuates at modulation frequency 410, which is coupled to the mechanical frequency of slider 125. Modulation frequency 410 of slider 125 is superimposed onto data frequency 420 associated with data written on data tracks 135.

The mechanical frequency of slider 125, and hende modulation frequency 410, depends upon several factors, for example: the design of slider 125, the speed at which disk 156 rotates, the air flow around disk stack 158, and the topography of disk surface 130. For a given HDD and ABS design, modulation frequency 410 associated with slider 125 is predictable and recognizable from other frequencies.

Modulation frequency 410 associated with slider 125, data frequency 420 associated with data written on data tracks 135, and a frequency associated with components and sub-assemblies of HDD 100 are easily identifiable. These frequencies are orders of magnitude apart. For example, the range of frequency 415 coupled with modulation frequency 410, which is associated with the mechanical frequency of slider 125, can be between 100 KHz to 500 KHz. An example of the range of frequency 425 coupled with data frequency 420, which is associated with data written on data tracks 135, can be between 100 MHz to 2 GHz. Amplitude 417 of modulation frequency 410 associated with slider 125 is lower than amplitude 427 of data frequency 420 associated with data written on data tracks 135. Read-back signal (310, 430) may also have other frequencies that are much lower and are usually associated with structural resonances of components and sub-assemblies in HDD 100. These are in a range for example between 100 Hz and 25 KHz.

In accordance with an embodiment of the present invention, frequencies that are usually associated with structural resonances, e.g. frequencies in the range of 100 Hz to 25 KHz, of components and sub-assemblies in HDD 100 are removed from read-back signal (310, 430) by a filter. The removal of frequencies from read-back signal (310, 430) with filters is well known and understood in the art. Mechanical frequencies of slider 125, e.g. frequencies between 100 KHz to 500 KHz, are not removed from read-back signal (310, 430) and are used to detect slider 125 flying towards the lower values of fly height 440.

Modulation frequency 410 associated with slider 125 is usually excited during the occasion of slider 125 flying sufficiently close to disk surface 130 to interact with disk surface 130. In accordance with the Wallace equation, as slider 125 begins to fly sufficiently close to disk surface 130 to interact with disk surface 130, modulation frequency 410 associated with slider 125 begins to appear in read-back signal (310, 430) as an occasional perturbation superimposed on data frequency 420 associated with data written on data tracks 135. As the interaction increases between slider 125 and disk surface 130, the rate at which the superimposed perturbation occurs also increases. As contact is imminent between slider 125 and disk surface 130, the rate of occurrence of the superimposed perturbation is substantially equal to modulation frequency 410 associated with slider 125. Upon contact of slider 125 with disk surface 130, amplitude 417 of modulation frequency 410 increases and frequency 415 associated with modulation frequency 410 may become irregular.

In accordance with another embodiment of the present invention, read-back signal (310, 430) comprises signal noise inherent in disk 156, and modulation frequency 410 associated with at least one mechanical frequency of magnetic transducer 225. Magnetic transducer 225 reads noise from a disk surface 130 with or without the presence of data tracks 135. The mechanical frequency of the magnetic transducer 225, which is coupled with slider 125, includes the mechanical frequency of slider 125. This is due in part to the changes in fly height 440 experienced by magnetic transducer 225 during vibration of slider 125. As slider 125 vibrates magnetic transducer 225 cycles between being closer and being farther from data track 135. In accordance with the Wallace equation, read-back signal (310, 430), which is read by magnetic transducer 225, fluctuates at modulation frequency 410 of slider 125. Without the presence of data tracks 135, modulation frequency 410 of slider 125 is superimposed onto signal noise inherent in disk 156. With the presence of data tracks 135, modulation frequency 410 of slider 125 is superimposed onto signal noise inherent in disk 156 and data frequency 420 associated with data written on data tracks 135.

In accordance with embodiments of the present invention, processing and analyzing read-back signal (310, 430) in accordance with the Wallace equation, which is enabled by A/E module 115, fly height 440 of slider 125 can be monitored.

Operation

Figure 5:
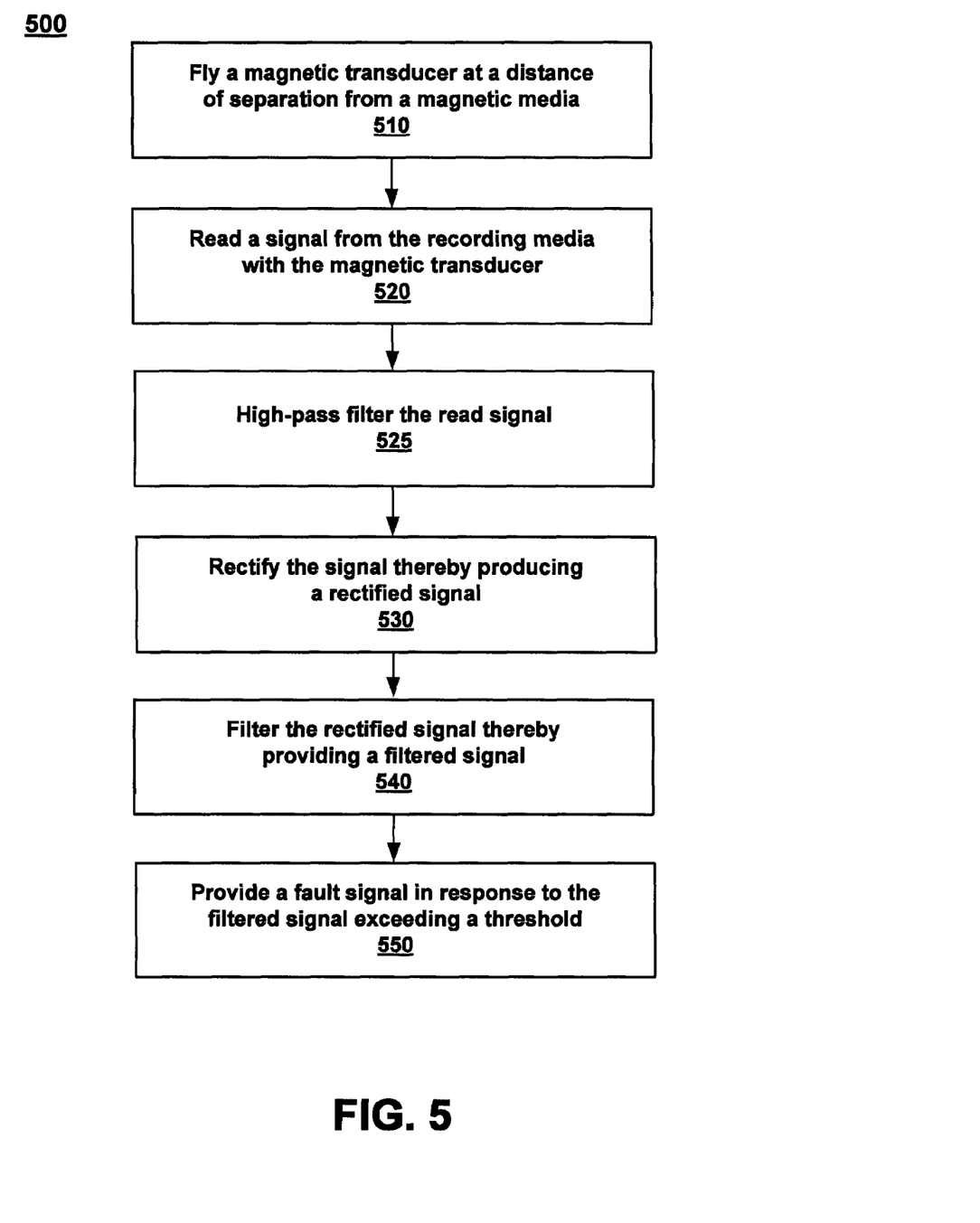
FIG. 5 is a flow chart illustrating a process for monitoring a fly height of a magnetic transducer in accordance with one embodiment of the present invention.

FIG. 5 is a flow chart illustrating a process 500 for monitoring a fly height of a magnetic transducer, in accordance with an embodiment of the present invention. In accordance with an embodiment of the present invention, process 500 for monitoring a fly height of a magnetic transducer is performed within an HDD while magnetic transducer 225 is in use by an end user. In accordance with an embodiment of the present invention process 500 is performed on a spin stand in a factory environment for testing, adjusting, calibrating, and monitoring a fly height of a magnetic transducer. In accordance with an embodiment of the present invention, process 500 is performed prior to and during servo-write for the benefit of enhancing the reliability of the HDD. An example of this benefit is to adjust the fly-height as close to the disk as possible without causing damage to the disk, and thusly write servo data with the largest amplitude possible and with the least modulation. By having optimized servo data, a customer's data is located faster due to fewer attempts at reading the servo data and thusly enhances the reliability of the servo system and the HDD.

In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific components are disclosed in process 500, such components are examples of components for carrying out process 500. That is, the embodiments of the present invention are well suited to performing various other components or variations of the components recited in FIG. 5. Within the present embodiment, it should be appreciated that the components of process 500 may be performed by software, by hardware, by an assembly mechanism, through human interaction, or by any combination of software, hardware, assembly mechanism, and human interaction.

Process 500 will be described with reference to elements shown in FIG. 1, FIG. 3, and FIG. 4.

In one embodiment, as shown at 510 of process 500, magnetic transducer 225 is flown at a distance of separation (fly height 440) from magnetic media on disk surface 130. In accordance with an embodiment of the present invention, magnetic transducer 225 is coupled with slider 125, which is coupled with a thermal fly height control (TFC) device. It should be appreciated that a TFC device is one of several means operable for adjusting fly height in accordance with embodiments of the present invention. Some examples of means for adjusting fly height include, but are not limited to: a PZT coupled with a suspension to deflect the suspension and urge the magnetic transducer closer to or further from the magnetic recording media; a shape memory alloy, also known as SMA and NITINOL, coupled with a suspension to deflect the suspension and urge the magnetic transducer closer to or further from the magnetic recording media; and a PZT coupled with a slider to deflect the slider and urge the magnetic transducer closer to or further from the magnetic recording media.

In accordance with an embodiment of the present invention, and at 510 of process 500, magnetic transducer 225 is coupled to HDD 100 during operation of HDD 100 in an end user environment. In accordance with an embodiment of the present invention, and at 510 of process 500, flying magnetic transducer 225 at fly height 440 from disk surface 130 is performed on a spin stand in a factory environment. In accordance with an embodiment of the present invention, and at 510 of process 500, flying magnetic transducer 225 at fly height 440 from disk surface 130 is performed prior to and during servo-write of disk stack 158. An example of a benefit to performing component 510 of process 500 before and during servo-write is to adjust the fly-height of magnetic transducer 225 as close to disk surface 130 as possible without causing damage to the disk surface 130. By doing so, servo data is written with the largest amplitude possible and with the least modulation. By having optimized servo data, a customer's data is located faster due to fewer attempts at reading the servo data and thusly enhances the reliability of the servo system and the HDD.

In one embodiment, as shown at 520 of process 500, read-back signal (310, 430) is read from the magnetic media on disk surface 130 with magnetic transducer 225. In accordance with an embodiment of the present invention, read-back signal (310, 430) comprises data frequency 420 associated with data written on data tracks 135, signal noise inherent in disk 156, and modulation frequency 410 associated with at least one mechanical frequency of magnetic transducer 225. In accordance with another embodiment of the present invention, read-back signal (310, 430) comprises signal noise inherent in disk 156, modulation frequency 410 associated with at least one mechanical frequency of magnetic transducer 225, and no data frequency 420 associated with data written on data tracks 135. Read-back signal (310, 430) devoid of data frequency 420 exists prior to servo-writing disk stack 158.

In accordance with another embodiment, as shown at 525 of process 500, read-back signal (310, 430) is filtered with high pass filter 315. A frequency that is not associated with a mechanical frequency of magnetic transducer 225 is removed from read-back signal (310, 430). Examples of such a frequency are: thermal resistance changes of magnetic transducer 225; spurious low frequency noise; and the like.

In one embodiment, as shown at 530 of process 500, read-back signal (310, 430) received from magnetic transducer 225 is rectified with rectifier 320 thereby producing a rectified signal. A rectified signal can be operated upon by other devices such as filter 330.

In one embodiment, as shown at 540 of process 500, the rectified signal is received from component 530 of process 500 and filtered by filter 330, thereby providing a filtered signal of the rectified signal. The power spectrum is operable for integration and analysis of the power contained in read-back signal (310, 430). By appropriately selecting filter 330, frequencies that are coupled to fly height 440, such as frequencies associated with mechanical components and subassemblies of HDD 100 can be removed from the power spectrum, while frequencies of interest, such as those associated with a mechanical frequency of slider 125 can be preserved.

In one embodiment, as shown at 550 of process 500, fault signal 350 is provided in response to the filtered signal exceeding a threshold. Fault signal 350 is operable for controlling at least one operation of HDD 100. For example, fault signal 350 can effect HDD 100 to increase the fly height 440 of slider 125; fault signal 350 can effect HDD 100 to decrease the fly height of slider 125; and fault signal 350 can stop at least one operation of HDD 100 such as, shut down HDD 100, stop an impending writing of data, and stop reading of data.

In accordance with an embodiment of the present invention, fault signal 350 can effect HDD 100 to increase the fly height 440 of slider 125 in response to the occurrence of fault signal 350 being too frequent, indicating that a head crash could be imminent. In accordance with an embodiment of the present invention, fault signal 350 can effect HDD 100 to decrease the fly height of slider 125 in response to the occurrence of fault signal 350 being too infrequent, indicating that slider 125 may not be flying at an optimum fly height 440 for reading and/or writing a data track 135 with maximum amplitude.

The present invention, in the various presented embodiments improves the reliability and performance of an HDD. Embodiments of the present invention provide a means for monitoring the fly height of a slider in an HDD and enable the slider to fly at an optimum fly height for reading and writing modulation free data tracks with the highest possible amplitude. Embodiments of the present invention enable the magnetic transducer to fly as close as possible to the disk for maximum read and write data signal amplitude without encountering damage from excessive slider-to-disk contact. In so doing, the HDD experiences fewer attempts to retrieve data by reading data with fly height optimized for maximum read-back signal amplitude. The reliability of the HDD is improved by monitoring the fly height to avoid damage to the magnetic transducer from disk contact.

The present invention, in the various presented embodiments improves HDD reliability by providing a means for the HDD to react to conditions that can result in the magnetic transducer contacting the disk and damaging the magnetic transducer and/or the data written on the disk surface. Examples of these conditions are: temperature, atmospheric pressure, contamination, and mechanical shock, all of which affect fly height. Embodiments of the present invention enable the HDD to: increase the fly height; stop an impending writing or reading of data; and/or shut down the HDD. Such actions by the HDD preserve a customer's data until conditions are more benevolent for HDD operation or data recovery.

The present invention, in the various presented embodiments enables writing optimized servo data on a disk containing no data. Mechanical frequency of a slider is detected as a modulation of signal noise in the read-back signal. Per the presented embodiments of the present invention, modulation of signal noise in the read-back signal is used to monitor the fly height of a magnetic transducer. Such monitoring allows optimization of the fly height so that servo data with maximum amplitude is written.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for monitoring a fly height of a magnetic transducer, said method comprising:
    flying said magnetic transducer at a distance of separation from a recording media;
    reading a read-back signal from said recording media with said magnetic transducer;
    rectifying said read-back signal thereby producing a rectified signal;
    filtering said rectified signal thereby providing a filtered signal; and
    providing a fault signal in response to said filtered signal exceeding a threshold.

2. The method of claim 1 further comprising:
    high-pass filtering said read-back signal prior to said rectifying said read-back signal.

3. The method of claim 1 wherein said monitoring a fly height comprises:
    increasing the fly height of said magnetic transducer in response to said filtered signal exceeding said threshold.

4. The method of claim 1 wherein said monitoring a fly height comprises:
    decreasing the fly height of said magnetic transducer in response to said filtered signal not exceeding said threshold.

5. The method of claim 1 wherein said monitoring a fly height comprises:
    stopping at least one operation of a hard disk drive in which a frequency of said magnetic transducer occurs in response to said exceeding said threshold.

6. The method of claim 5 wherein said stopping said operation of said hard disk drive comprises:
    stopping in response to a frequency of said magnetic transducer exceeding said threshold.

7. The method of claim 1 wherein said flying said magnetic transducer comprises:
    flying a slider having a thermal fly height control device.

8. The method of claim 1 wherein said flying said magnetic transducer comprises:
    flying a slider coupled with a hard disk drive.

9. An arm electronics module operable for receiving a read-back signal from a magnetic transducer, said arm electronics module comprising:
    a rectifier for rectifying said read-back signal and providing a rectified signal;
    a filter for providing a filtered signal of said rectified signal, said filtered signal containing at least one mechanical frequency of said magnetic transducer; and
    a threshold detector for providing a fault signal coupled to an occurrence of said mechanical frequency of said magnetic transducer in said filtered signal.

10. The arm electronics module of claim 9 further comprising:
    a high pass filter operable for removing from said read-back signal, frequencies associated with noise in a hard disk drive.

11. The arm electronics module of claim 9 wherein said rectifier is a diode.

12. The arm electronics module of claim 9 wherein said rectifier is a full wave rectifier.

13. The arm electronics module of claim 9 wherein said rectifier is a half wave rectifier.

14. The arm electronics module of claim 9 wherein said filter is operable for passing said mechanical frequency of said magnetic transducer.

15. The arm electronics module of claim 9 wherein said threshold detector is coupled to an output port.

16. The arm electronics module of claim 9 wherein said threshold detector comprises an RMS threshold detector.

17. A hard disk drive comprising:
    a base casting for providing attachment points for major components of said hard disk drive;
    a motor-hub assembly to which at least one disk is coupled, wherein said motor-hub assembly is attached to said base casting, wherein said disk has at least one surface of data tracks; and
    a head stack assembly comprising:
        a comb to which at least one suspension is coupled, wherewith a slider including a magnetic transducer for reading and writing said data tracks onto said surface is coupled to said comb; and
        an arm electronics module operable for receiving a read-back signal from said magnetic transducer, said arm electronics module comprising:
            a rectifier for rectifying said read-back signal and providing a rectified signal;
            a filter for providing a filtered signal of said rectified signal, said filtered signal containing at least one mechanical frequency of said magnetic transducer; and
            a threshold detector for presenting a fault signal coupled to an occurrence of said mechanical frequency of said magnetic transducer in said filtered signal.

18. The hard disk drive of claim 17 wherein said read-back signal from said magnetic transducer does not comprise data from said data tracks.

19. The hard disk drive of claim 17 wherein said rectifier is a diode.

20. The hard disk drive of claim 17 wherein said rectifier is a full wave rectifier.

21. The hard disk drive of claim 17 wherein said rectifier is a half wave rectifier.

22. The hard disk drive of claim 17 wherein said filter is operable for passing said mechanical frequency of said magnetic transducer.

23. The hard disk drive of claim 17 wherein said threshold detector is coupled to an output port.

24. The hard disk drive of claim 17 wherein said threshold detector is coupled to a controller of said hard disk drive.

25. The hard disk drive of claim 17 wherein said filter is operable for passing said mechanical frequency of said slider.

* * * * *